![United States Patent Office logo] 3,256,167
Patented June 14, 1966

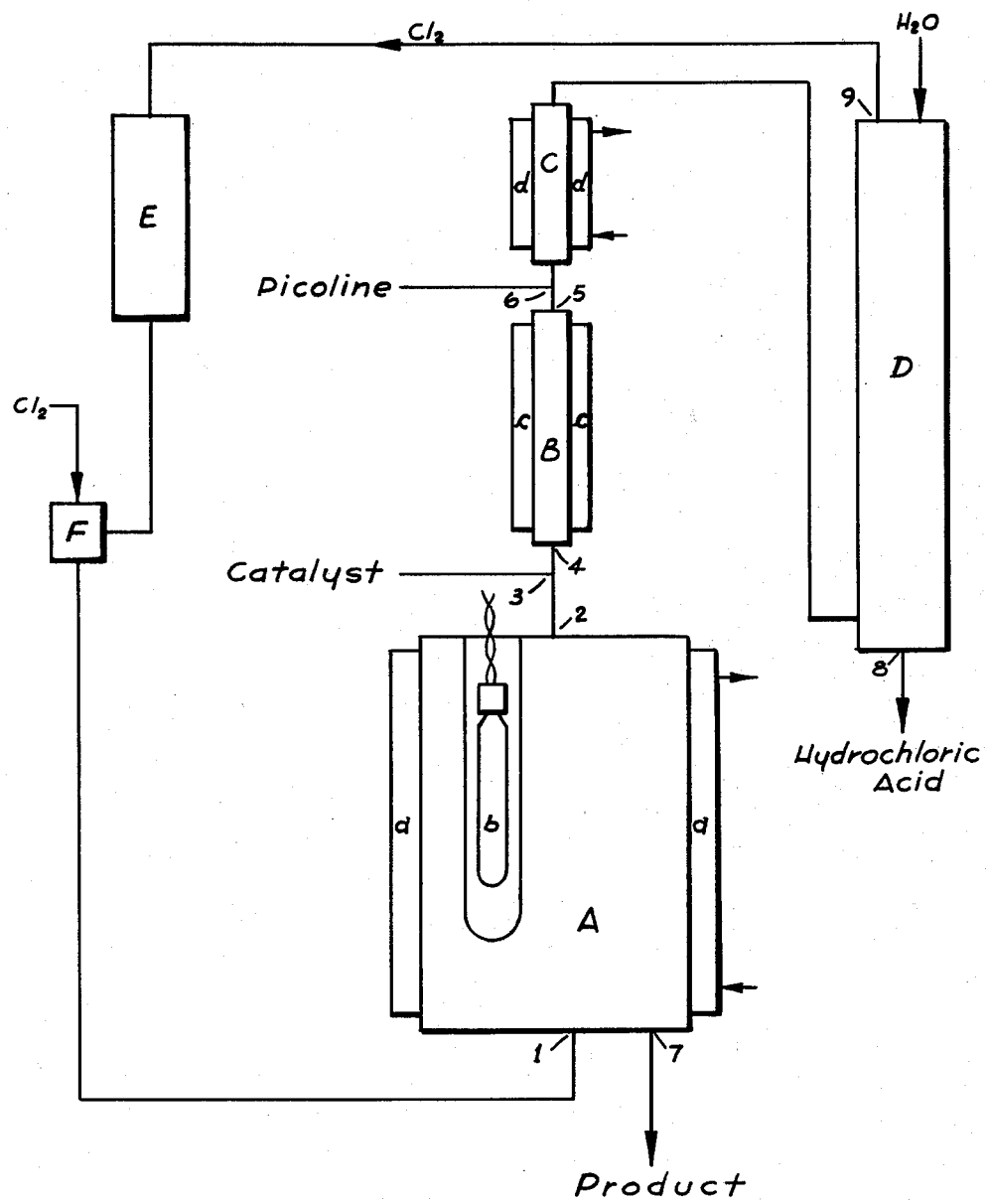

3,256,167
PROCESS FOR 3,4,5,6-TETRACHLORO-2-(TRI-CHLOROMETHYL)PYRIDINE COMPOSITION
Frederick H. Norton and William H. Taplin III, Concord, Calif., assignors to The Dow Chemical Company, Midland, Mich., a corporation of Delaware
Filed Mar. 6, 1962, Ser. No. 177,871
16 Claims. (Cl. 204—158)

This invention relates to chlorination and more particularly to methods for selectively preparing certain highly chlorinated picoline compounds.

Certain highly chlorinated picoline compounds are useful as pesticides or as intermediates for the preparation of other compounds having pesticidal properties. However, known methods of chlorination have provided such complex mixtures and low yields of the various components as to render such methods unsuitable as synthetic methods for the preparation of a particular component or group of components. Thus, chlorination of picolines has been carried out in the presence of water whereby a spectrum of chlorination products have been obtained, none in significant amounts. Although certain of the components obtained by this method may be recovered by fractional distillation, because of the uncontrollability of the process for selective preparation of products, the actual amount of one or of even several of the components taken together have been so small as to render the method inoperative for preparative purposes. The other known procedure for chlorination of picolines employs the step of saturating liquid picoline with hydrogen chloride whereupon a heterogeneous mixture containing solid picoline hydrochloride in picoline is formed and thereafter passing gaseous chlorine through the mixture for a long period to effect a reaction as evidenced by the disappearance of the solid and formation of a relatively homogeneous mixture. This procedure has produced a wide range of chlorinated products and a great deal of tarry materials and although some of the components have been recoverable by fractional distillation, the amount of any particular product or group of products has been small. Thus, as with the previous method, has not been employable as a reproduceable method for the production of selected chlorinated picoline product or a group of products.

According to the present invention, it has been discovered that high yields of highly chlorinated materials may be prepared in a continuous process. More particularly, it has been discovered that good yields of highly chlorinated picoline compounds wherein the product is enriched in 3,4,5,6-tetrachloro-2-(trichloromethyl)pyridine may be prepared by a continuous low temperature chlorination process as hereinafter described. The product mixture contains two other highly chlorinated picolines in significant but readily separable amounts and which is substantially free of isomeric contaminants, lower chlorinated materials and decompositions products. By carrying out the process of the present invention, a product composition, is obtained which is enriched in 3,4,5,6-tetrachloromethyl-2-(trichloromethyl)pyridine and which contains 3,4,5-trichloro-2-(trichloromethyl)pyridine and 3,4,5-trichloro-2-(dichloromethyl)pyridine as the other major components. It is significant that not only does the present process permit the preparation of the desired components in good yields and in a form readily separable from the minor amounts of lower chlorinated by-products, but that the by-products are free from tarry decomposition products, permitting their use as starting materials for the preparation of other chemical intermediates and ultimate chemical products. The present process also provides for the first time, a method which is feasible as a preparative method for highly chlorinated (trichloromethyl)pyridine compounds, and which furthermore is a feasible commercial production method.

It has been discovered that chlorination of α-picoline may be carried out rapidly and economically and with the production of a mixture enriched in 3,4,5,6-tetrachloro-2-(trichloromethyl)pyridine in a process which comprises introducing α-picoline and gaseous chlorine continuously and simultaneously at points substantially removed from one another into a reaction system whereby a reaction takes place in the liquid phase to form the desired product mixture enriched in 3,4,5,6-tetrachloro-2-(trichloromethyl)pyridine. Hereinafter, when the expression "picoline" is employed, it will be intended to designate "α-picoline." The process involves first forming a liquid picoline hydrochloride composition, introducing the composition into a liquid phase system, bubbling gaseous chlorine through the liquid phase system under controlled temperature conditions to produce the desired mixture enriched in 3,4,5,6-tetrachloro-2-(trichloromethyl)pyridine. By "liquid picoline hydrochloride composition" is meant a homogeneous liquid mixture or solution which results when picoline hydrochloride which is normally a solid is brought into contact with excess hydrogen chloride gas. In this process, chlorine gas is introduced into an appropriate, heated liquid system comprising an initiator charge, as hereinafter described, to produce hydrogen chloride gas in situ which is conducted therefrom to a cooled system and contacted with picoline in a counter-current flow to form a liquid picoline hydrochloride composition which is returned to the heated liquid system whereupon it reacts with gaseous chlorine to produce the desired product composition enriched in 3,4,5,6-tetrachloro-2-(trichloromethyl)pyridine.

The "initiator charge" which is placed in the primary reactor to initiate the process of the present invention is defined as a liquid material which when contacted with gaseous chlorine reacts to produce hydrogen chloride. Although the requirement may be met with innumerable materials, as a practical matter, it is "picoline charge" and the recommended materials are chlorinated picoline mixture, preferably, a highly chlorinated picoline composition particularly of density 1.65–1.8. Such material would still contain reactable hydrogen but would avoid introduction of foreign matter. It is to be noted that once the process has been initiated there will be a chlorinated picoline mixture available as initiator charge. If no chlorinated picoline is available, a small amount of picoline diluted with an inert low boiling solvent may be employed, the solvent being readily removable from the product after recovery thereof. Introduction of several equivalents of anhydrous HCl prior to chlorine introduction is necessary in this case. Otherwise solid picoline monohydrochloride which is detrimental to good yields contemplated by the process of this invention will form.

The hydrogen chloride formed in situ is conducted to a cooled secondary reactor where under controlled temperated conditions it is contacted with picoline in an atmosphere of excess hydrogen chloride to form liquid picoline hydrochloride composition. It is to be noted that hydrogen chloride from an external source is not inoperable in this step but inasmuch as once the reaction has started there is always an abundant internal supply of hydrogen chloride, a method which contemplates an external supply is impractical. In this step, initially, picoline hydrochloride is formed but in the presence of excess hydrogen chloride, a liquid composition is formed. The presence of excess hydrogen chloride and the smooth conversion of picoline to liquid picoline hydrochloride composition under controlled temperature conditions is critical and essential not only for obtaining good yields of the product but also for efficient operation of the present invention. As will be discussed hereinafter in connection with a production system suitable for carrying out the present invention, an efficient means for contacting hydrogen chloride and picoline is in a counter-current flow relationship and the smooth conduction of the resulting material to the primary reactor is achieved by down-flow of a liquid composition. The desired results are achieved by controlling the temperatures in such a manner that a significant proportion of the initial heat of reaction between picoline and hydrogen chloride is removed but wherein a sufficiency of heat is retained to permit the formation of a liquid composition and to maintain the composition in a liquid state along the down-flow path to the primary reactor. Achievement of desired temperature control is best accomplished by employing a reactor of such shape and/or dimensions as to provide a high degree of positive temperature control throughout the reactor. Inasmuch as the reaction of picoline hydrochloride formation is exothermic, it is desirable that the reactor have a relatively large area of cooling surface or walls where the extent of cooling may be externally controlled. A suitable temperature range for carrying out this step is from about 20° to about 70° C. It is essential that significantly higher temperatures be avoided in order that undesirable by-product formation or mechanical difficulties resulting from such by-product formation be prevented. It is also important that temperatures appreciably below 20° C. be avoided to preclude mechanical difficulties resulting from solid picoline hydrochloride separation or from chemical difficulties resulting from solid picoline hydrochloride falling into or being carried into the primary reactor. It is important that solid picoline hydrochloride not be carried into the primary reactor. An average temperature of about 50° C. is convenient. It is also to be noted that unmodified picoline cannot be introduced directly into the primary reactor in place of the liquid composition obtained as hereinabove described to achieve the same results. Such change will result in poor yields and frequently intractable mixtures.

The exact rate of introduction of chlorine into the primary reactor depends on the particular size of operation, shape of reactor, whether or not mechanical mixing is employed, etc. For efficient operation of this process, it is important that about 80 to 85 percent molar excess of chlorine be present at all times in the reactor to assure not only a rapid conversion of the reactant picoline hydrochloride material but also to continuously sweep out hydrogen chloride from the reactor. The desirable rate may be expressed in terms of the rate of introduction of the reactant picoline into the reaction system. Such rate is considered to be a ratio of chlorine to picoline of from about 11.5:1 to about 21.5:1 on weight basis. Illustrative of a desirable rate is that of from about 4 to 6 pounds of chlorine per hour at a picoline feed rate of 0.28 to 0.35 pounds per hour when introduced into a 6.4 gallon reactor containing about 4.5 gallons of reaction mixture. The residence time is dependent on volume of reaction mixture and picoline feed rate necessary to hold a steady state. By "steady state" is meant the condition attained when the composition of the reaction mixture is no longer changing significantly. The time necessary to achieve a steady state depends on conditions applied to the system and is readily determined by the skilled in the art. The density of the reaction mixture at steady state is from about 10 to 12 pounds per gallon, the average figure being about 11 pounds per gallon. It is to be noted that this density is an average density of the overall mixture in the reactor inasmuch as there develops as the reaction approaches a steady state, a dual liquid phase system of substantially definite proportions and having the above average densities. The upper liquid phase is a liquid hydrochloride composition comprising picoline hydrochloride and lower chlorinated picoline hydrochloride in excess hydrogen chloride, and the lower liquid phase comprises a highly chlorinated mixture enriched in 3,4,5,6-tetrachloro-2-(trichloromethyl)pyridine. Assuming the reactor charge composition set forth above, and a picoline feed rate of 0.3 pound per hour, and an average molecular weight of product of 300, the residence time would be 50 hours.

It is further important in this process for the selective preparation of a mixture enriched in 3,4,5,6-tetrachloro-2-(trichloromethyl)-pyridine that careful controls be made of the temperature of the reaction mixture, i.e., the temperature of the primary reactor. It is critical and essential that the temperature not be allowed to remain over 120° C. for any significant period of time. The desired temperature range is from about 95° to about 110° C. Consistently good results have been achieved at 100° C.

The reaction may be carried out in the presence or absence of a catalytic light source. The use of irradiation is considered preferable. A light source emitting light at a wave length of from about 2000 A. to 5000 A. and particularly between about 3000 A. to about 4000 A. are suitable. When the reaction is carried out in the presence of light, the light source may double as a source of heat.

The reaction may be carried out in the presence or absence of a catalyst. A mixture enriched in highly chlorinated picoline compounds, particularly in 3,4,5,6-tetrachloro-2-(trichloromethyl)pyridine is obtained in good yields in the absence of catalyst; this is noted particularly when product composition obtained by this method is compared with products obtained by using known chlorination methods. However, it has been found that by using Lewis acid catalysts in the present process, the yield of the desired product composition is significantly increased; thus, the preferred method for preparing a mixture enriched in 3,4,5,6 tetrachloro-2-(trichloromethyl)pyridine contemplates the use of a Lewis acid catalyst. Any Lewis acid catalysts as understood in the art may be employed. Particularly desirable are aluminum chloride, phosphorus trichloride and ferric chloride. Others include stannic chloride, antimony trichloride, thionyl chloride, sulfuryl chloride, phosphorous pentachloride, calcium chloride, iodine, red phosphorus, etc. Lower valent salts of multi-valent metals as well as free metals may be employed. The latter when employed is readily converted by the hydrogen chloride formed in the reaction mixture to the corresponding metal chloride. The catalyst may be added in any amount up to 5 percent by weight of the picoline feed. Preferred amounts are from 0.5 to 1 percent by weight.

The mixture enriched in 3,4,5,6-tetrachloro-2-(trichloromethyl)pyridine thus obtained is water-white in color, has a substantially constant density, contains only minor proportions of lower chlorinated picolines and is substantially free of hydrogen chloride. This enriched product mixture forms a lower liquid phase in the reactor while the less chlorinated picoline dissolved in hydrogen chloride forms the less dense upper liquid phase. The exact composition of the product mixture to be removed from the reactor at the steady state may be determined by vapor phase chromatographic analysis of samples or may be estimated by density comparison with a predetermined density-composition correlation. The average densities of the product enriched in 3,4,5,6-tetrachloro-2-(trichloromethyl)pyridine, containing 3,4,5-trichloro-2-(trichloromethyl)pyridine and 3,4,5-trichloro-2-(dichloromethyl)pyridine as the major components vary from 1.68 to 1.78, usually about 1.73. The product may be bled from the reactor by conventional methods and may be separated into its components, if desired, by fractional distillation.

The present invention may be described more fully by reference to the accompanying flow sheet.

The apparatus comprises primarily of primary reactor A, reactor B, condenser C, hydrogen chloride absorption column D, chlorine drier E and gas shunting device F. Reactor A is the primary reactor to be employed as a liquid phase chlorinator; it is fitted with temperature control means $a$ for heating or cooling and optionally with an ultraviolet or other actinic light source b. Reactor B is a preliminary reactor for converting picoline into a liquid picoline hydrochloride composition suitable for chlorination; it is fitted with cooling means c. The exact dimensions of reactor B are not important but must be such as to provide sufficient cooling to prevent by-product formation but without excessive cooling as to cause separation of solid picoline hydrochloride. Good results have been obtained when the diameter:length ratio was about 1:18 and tap water used for cooling. Condenser C has for its primary purpose avoidance of entrainment losses of reactant or product with effluent gases; it is fitted with cooling means d. A means for avoiding entrainment losses is necessary to obtain good yields contemplated by the method of the present invention; it is to be noted however that a separate condenser unit may not be necessary as shown in the diagram but may become part of an integral design of reactor B. Such modifications would be well-known to the skilled in the art. The hydrogen chloride absorption column D is a means for removing hydrogen chloride from the mixed chlorine-hydrogen chloride gases; it consists of downflowing water which meets the gases in counter-current relationship and aqueous hydrochloric acid is recovered at the bottom of the column. Chlorine drier E may be any suitable means for drying chlorine gas, a packed silica gel column being convenient; it is not by any means limited thereto and any device adapted to remove entrained water from chlorine using suitable dessicant such as sulfuric acid or magnesium perchlorate may be employed. A chlorine drier is of utmost importance in use of recycled chlorine inasmuch as the method of the present invention is carried out under substantially anhydrous conditions in contrast to known chlorination methods where water either is not excluded or is added. Gas shunting device F is any conventional device usable for joining gases from two sources to a single flow system.

As a first step in carrying out the reaction, an initiator charge, previously defined, is placed in reactor A. Chlorine gas is introduced into the thus charged reactor A at 1 whereupon a reaction takes place with the evolution of hydrogen chloride gas which leaves the reactor through inlet-outlet 2 and proceeds upward through orifice 4 into reactor B. Picoline is introduced at inlet 6 where it proceeds by gravity flow into cooled reactor B, meeting the hydrogen chloride in a counter-current flow relationship and reacting on the walls thereof to form picoline hydrochloride which in the presence of excess hydrogen chloride is converted into a liquid picoline hydrochloride composition. The temperature in reactor B is controlled so that the down-flowing liquid picoline hydrochloride composition remains homogeneous and continues smoothly without the separation of solid picoline hydrochloride on the walls of the apparatus. The liquid picoline hydrochloride composition enters reactor A where, in the liquid phase and under controlled temperature conditions, it reacts with gaseous chlorine to produce the desired product mixture of chlorinated picolines enriched in 3,4,5,6-tetrachloro-2-(trichloromethyl)pyridine which may be recovered at 7.

Hydrogen chloride, chlorine gas and entrained liquids proceed from reactor B to condenser C where the entrained liquids are separated from the gases by condensation and returned to reactor B. The gases proceed from the condenser to absorption column D where the gases meet down-flowing water in a counter-current relationship and wherein hydrogen chloride dissolves in the water forming hydrochloric acid which is recovered at 8. The gaseous chlorine proceeds from the absorption column at 9 and proceeds to chlorine drier E. The chlorine after passing through drying column B is joined at F with fresh chlorine and recycled through the reactor system.

When the process of the present invention is carried out in the presence of a catalyst, the catalyst may be introduced at inlet 3, whereby it is conveyed into reactor A through inlet-outlet 2. The catalyst may be added continuously or periodically in portions. When the catalyst is introduced in the form of a metal, it comes into contact with gaseous hydrogen chloride leaving reactor A, and is converted substantially immediately to the appropriate metal chloride.

The following examples illustrate the invention but are not to be construed as limiting:

Example 1

An operation was carried out in an apparatus having a schematic arrangement set forth in the accompanying drawing wherein reactor A was a vessel of 17 liter capacity and illuminated with ultraviolet light, reactor B was a water-cooled column 2 inches in internal diameter and 36 inches in length, a condenser C was a water-cooled column 2 inches in diameter and 14 inches in length.

Reactor A was charged with 3.2 pounds of a mixture of partially chlorinated picoline from a previous run as the initiator charge. The temperature of the charged reactor was then raised to 100° C. and gaseous chlorine introduced at inlet 1 at a rate of about 9 pounds per hour. The gaseous chlorine reacted with the partially chlorinated picoline in the initiator charge, forming hydrogen chloride which evolved from the mixture, leaving reactor A at 2 and entering reactor B at 4. Picoline was introduced at inlet 6 at a rate of 0.7 pound per hour. The picoline, thus introduced, contacted hydrogen chloride gas in a counter-current flow relationship and reacted therewith forming picoline hydrochloride which in the presence of excess hydrogen chloride gas formed a liquid picoline hydrochloride composition which proceeded downward into the primary reactor. 0.5 pound of aluminum chloride catalyst (about 1 percent by weight based on the total picoline used) was introduced at inlet 3. The catalyst came into contact with the liquid picoline hydrochlorine composition leaving reactor B and was carried therewith into reactor A. The liquid picoline hydrochloride composition thus continuously introduced into the chlorination medium of reactor A, reacted with gaseous chlorine which was continuously introduced over a period of 72 hours to produce a product mixture enriched in 3,4,5,6-tetrachloro-2-(trichloromethyl)pyridine. After the steady state was reached, the product mixture was continuously removed from the reactor at 7 and amounted to 130 pounds. Vapor phase chromatographic analysis of the product mixture enriched in 3,4,5,6-tetrachloro-2-(trichloromethyl)pyridine showed the mixture to contain in addition 3,4,5-trichloro-2-(trichloromethyl)pyridine and 3,4,5-trichloro-2-(dichloromethyl)pyridine as major components. The product composition in mole percent was as follows: 30 percent 3,4,5,6-tetrachloro-2-(trichloromethyl)pyridine, 32 percent 3,4,5-trichloro-2-(trichloromethyl)pyridine, 16 percent 3,4,5-trichloro-2-(dichloromethyl)pyridine, about 6 percent 3,5-dichloro-2-(trichloromethyl)pyridine, about 7 percent 3,5,6-trichloro-2-(trichloromethyl)pyridine and about 4 percent 3,5-dichloro-2-(dichloromethyl)pyridine.

The components of the reaction mixture are readily separated by fractional distillation. On distilling product mixture enriched in 3,4,5,6-tetrachloro-2-(trichloromethyl)pyridine, i.e., mixture containing primarily 3,4,5,6-tetrachloro-2-(trichloromethyl)pyridine, 3,4,5-trichloro-2-(trichloromethyl)pyridine and 3,4,5-trichloro-2-(dichloromethyl)pyridine, it is found that the lower chlorinated products distill off in the forerun, 3,4,5-trichloro-2-(dichloromethyl)pyridine distills at from 100° to 110° C. at 1 millimeter of mercury pressure, 3,4,5-trichloro-2-(trichloromethyl)pyridine at from 172° to 175° C. at 25 millimeters of mercury pressure and 3,4,5,6-tetrachloro-2-(trichloromethyl)pyridine is recovered as residue which solidifies on cooling and melts at 58°–60° C. after recrystallization from carbon tetrachloride.

Example 2

A reaction was carried out in a manner substantially as described in Example 1, except that the catalyst was introduced in the form of aluminum turnings, said aluminum reacting with the hydrogen chloride evolved from reactor A to form aluminum chloride in situ. By this modified procedure there was obtained 32 mole percent 3,4,5,6-tetrachloro-2-(trichloromethyl)pyridine, 30 mole percent 3,4,5-trichloro-2-(trichloromethyl)pyridine and 15 mole percent 3,4,5-trichloro-2-(dichloromethyl)pyridine.

*Example 3*

A similar operation was carried out in which the following modifications were made (a) change in rate of introduction of picoline to 250 grams per hour, (b) dark reaction, i.e., ultraviolet light was not employed, and (c) change in amount of catalyst employed (2 percent by weight of aluminum based on weight of picoline used). In a manner previously described, the chlorination was allowed to proceed for 40 hours to obtain a product mixture enriched in 3,4,5,6-tetrachloro-2-(trichloromethyl) pyridine which was continuously recovered from the reactor. Vapor phase chromatographic analysis of the product mixture showed 29 mole percent of 3,4,5,6-tetrachloro-2-(trichloromethyl)pyridine, 33 mole percent of 3,4,5-trichloro-2-(trichloromethyl)pyridine and 15 mole percent of 3,4,5-trichloro-2-(dichloromethyl)pyridine.

*Example 4*

In another similar operation, an irradiated chlorination was carried out wherein ferric chloride catalyst, introduced as metallic iron in an amount of 1.5 percent by weight of picoline, was employed. The reaction was carried out in a manner as previously described by introducing chlorine gas into reactor A charged with a partially chlorinated picoline mixture and introducing picoline into reactor B at a rate of 250 grams per hour for 24 hours to obtain a highly chlorinated product composition containing 29 mole percent 3,4,5,6-tetrachloro-2-(trichloromethyl)pyridine, 32 mole percent 3,4,5-trichloro-2-(trichloromethyl)pyridine and 17 mole percent 3,4,5-trichloro-2-(dichloromethyl)pyridine.

*Example 5*

In another operation, picoline was introduced into reactor B at a rate of 250 grams per hour for 30 hours, phosphorus pentachloride catalyst was added to reactor A in an amount totalling 1 percent of the amount of total picoline employed, and gaseous chlorine was bubbled into an irradiated mixture of initiator charge of partially chlorinated picolines in reactor A for a period of 30 hours to obtain product containing 30 percent of 3,4,5,6-tetrachloro-2-(trichloromethyl)pyridine, 33 percent of 3,4,5-trichloro-2-(trichloromethyl)pyridine and 17 percent of 3,4,5-trichloro-2-(dichloromethyl)pyridine.

The process of the present invention produces a very highly useful product composition which may be employed without change or may be separated into major components for ultimate use in product compositions or as starting materials for the preparation of other desirable products. Thus the 3,4,5,6 - tetrachloro - 2 - (trichloromethyl)pyridine enriched product may be diluted with inert adjuvants to obtain pesticidal treating compositions. In such use, the product is mixed with dispersing agents and dispersed in water to obtain spray compositions which when applied to foliage of bean, pigweed and foxtail plants effect complete kills of said plants. Alternatively, the 3,4,5,6-tetrachloro-2-(trichloromethyl)pyridine enriched product may be distilled to recover 3,4,5,6-tetrachloro-2-(trichloromethyl)pyridine or 3,4,5-trichloro-2-(trichloromethyl)pyridine which may separately be employed in pesticidal compositions. The product mixture may also be distilled to recover the components which may be employed as intermediates in the preparation of other chemical compounds, such as for example, aminochloropyridine compounds by heating the recovered component with liquid ammonia in a sealed vessel at temperatures of from about 70° to above 190° C. at autogeneous pressure. The resulting aminochloropyridine compounds may be employed for the control of insect pests such as house-fly, cockroach, mites, aphids, etc. or for the eradication of weeds or weed seeds. In such applications, the aminochloropyridine compounds may be prepared with dispersing agents to form aqueous dispersion or dispersed on inert solids to form dust compositions to be applied to infested areas.

We claim:
1. A process for preparing a mixture enriched in 3,4,5,6 - tetrachloro - 2 - (trichloromethyl)pyridine which comprises
    (1) contacting α-picoline and hydrogen chloride in a cooled reactor at temperatures in the range of from about 20° C. to about 70° C. to produce a liquid α-picoline hydrochloride composition,
    (2) contacting in the liquid phase in the absence of added water at temperatures in the range of from about 95° C. to about 120° C., said liquid α-picoline hydrochloride composition and gaseous chlorine;
wherein in the foregoing process, the chlorine and α-picoline are introduced in a ratio of chlorine to picoline of from about 11.5:1 to about 21.5:1 on a weight basis.

2. A process for preparing a mixture enriched in 3,4,5,6 - tetrachloro - 2 - (trichloromethyl)pyridine which comprises
    (1) contacting α-picoline and hydrogen chloride at temperatures in the range of from about 20° C. to 70° C. to produce a liquid α-picoline hydrochloride composition,
    (2) contacting said liquid α-picoline hydrochloride composition with gaseous chlorine in the liquid phase in the absence of added water at temperatures in the range of from about 95° C. to about 105° C.;
wherein in the foregoing process, the chlorine and α-picoline are introduced in a ratio of chlorine to picoline of from about 11.5:1 to 21.5:1 on a weight basis.

3. A method according to claim 2 wherein step (2) is carried out while the mixture is irradiated with actinic radiation.

4. A method according to claim 2 wherein step (2) is carried out in the presence of a Lewis acid catalyst.

5. A method according to claim 2 wherein step (2) is carried out in the presence of Lewis catalyst and actinic radiation.

6. A continuous process for the preparation of a mixture enriched in 3,4,5,6-tetrachloro-2-(trichloromethyl)-pyridine which comprises
    (1) continuously feeding α-picoline into a cooled reactor,
    (2) contacting substantially instantaneously at temperatures in the range of from about 20° C. to about 70° C. in said reactor, said α-picoline and hydrogen chloride to produce a liquid α-picoline hydrochloride composition,
    (3) conducting said liquid α-picoline hydrochloride composition from said cooled reactor to a controlled heated reactor,
    (4) continuously feeding gaseous chlorine into said heated reactor and contacting therein in the liquid phase in the absence of added water at temperatures of from about 95° C. to about 120° C. for time sufficient to complete the reaction, the chlorine and liquid picoline hydrochloride composition;
wherein in the foregoing process, the chlorine and α-picoline are introduced in a ratio of chlorine to picoline of from about 11.5:1 to about 21.5:1 on a weight basis.

7. A continuous process for the preparation of a mixture enriched in 3,4,5,6-tetrachloro-2-(trichloromethyl)-pyridine which comprises
    (1) charging a heated reactor with a picoline charge,
    (2) continuously passing gaseous chlorine therethrough to produce gaseous hydrogen chloride,
    (3) conducting gaseous hydrogen chloride from the heated reactor to a cooled reactor, (4) continuously feeding α-picoline into a cooled reactor to contact and react with hydrogen chloride at temperatures in the range of from about 20° C. to about 70° C. to form a liquid picoline hydrochloride composition, (5) conducting the liquid α-picoline hydrochloride composition to the heated reactor maintained in the temperature range of from about 95° C. to about 120° C. to react with chlorine in the liquid phase in the absence of added water to produce the desired product composition enriched in 3,4,5,6-tetrachloro-2-(trichloromethyl)pyridine, (6) continuously withdrawing the latter from the reaction mixture;

wherein in the foregoing process, the chlorine and α-picoline are introduced in a ratio of chlorine to picoline of from about 11.5:1 to about 21.5:1 on a weight basis.

8. A continuous process for the preparation of a mixture enriched in 3,4,5,6-tetrachloro-2-(trichloromethyl)-pyridine which comprises (1) charging a heated reactor with a picoline charge comprising chlorinated picolines having a density of from about 1.65 to 1.8, (2) continuously passing gaseous chlorine therethrough to produce gaseous hydrogen chloride, (3) conducting gaseous hydrogen chloride from the heated reactor to a cooled reactor, (4) continuously feeding α-picoline into a cooled reactor to contact and react with hydrogen chloride at temperatures in the range of from about 20° C. to about 70° C. to form a liquid α-picoline hydrochloride composition, (5) conducting the liquid α-picoline hydrochloride composition to the heated reactor maintained in the temperature range of from about 95° C. to about 120° C. to react with the gaseous chlorine in the liquid phase in the absence of added water to produce the desired product composition enriched in 3,4,5,6-tetrachloro-2-(trichloromethyl)pyridine, (6) continuously withdrawing the latter from the reaction mixture;

wherein in the foregoing process, the chlorine and α-picoline are introduced in a ratio of chlorine to picoline of from about 11.5:1 to about 21.5:1 on a weight basis.

9. A process for preparing a mixture enriched in 3,4,5,6 - tetrachloro - 2-(trichloromethyl)pyridine which comprises (1) contacting α-picoline and hydrogen chloride in a cooled reactor at temperatures in the range of from about 20° C. to about 70° C. to produce a liquid α-picoline hydrochloride composition, (2) contacting in the liquid phase in the absence of added water at temperatures in the range of from about 95° C. to about 120° C., said liquid α-picoline hydrochloride composition and gaseous chlorine:

wherein in the foregoing process, the rate of introduction of chlorine into the reactor is such as to provide for its presence therein throughout the reaction in about 80 to 85 percent molar excess on a stoichiometric basis.

10. A process for preparing a mixture enriched in 3,4,5,6 - tetrachloro - 2-(trichloromethyl)pyridine which comprises (1) contacting α-picoline and hydrogen chloride at temperatures in the range of from about 20° C. to about 70° C. to produce a liquid α-picoline hydrochloride composition, (2) contacting said liquid α-picoline hydrochloride composition with gaseous chlorine in the liquid phase in the absence of added water at temperatures in the range of from about 95° C. to about 105° C;

wherein in the foregoing process, the rate of introduction of chlorine into the reactor is such as to provide for its presence therein throughout the reaction in about 80 to 85 percent molar excess on a stoichiometric basis.

11. A method according to claim 10 wherein step (2) is carried out while the mixture is irradiated with actinic radiation.

12. A method according to claim 10 wherein step (2) is carried out in the presence of a Lewis acid catalyst.

13. A method according to claim 10 wherein step (2) is carried out in the presence of Lewis acid catalyst and actinic radiation.

14. A continuous process for the preparation of a mixture enriched in 3,4,5,6-tetrachloro-2-(trichloromethyl)pyridine which comprises (1) continuously feeding α-picoline into a cooled reactor, (2) contacting substantially instantaneously at temperatures in the range of from about 20° C. to about 70° C. in said reactor, said α-picoline and hydrogen chloride to produce a liquid α-picoline hydrochloride composition, (3) conducting said liquid α-picoline hydrochloride composition from said cooled reactor to a controlled heated reactor, (4) continuously feeding gaseous chlorine into said heated reactor and contacting therein in the liquid phase in the absence of added water at temperatures of from about 95° C. to about 120° C. for time sufficient to complete the reaction, the chlorine and liquid picoline hydrochloride composition;

wherein in the foregoing process, the rate of introduction of chlorine into the reactor is such as to provide for its presence therein throughout the reaction in about 80 to 85 percent molar excess on a stoichiometric basis.

15. A continuous process for the preparation of a mixture enriched in 3,4,5,6 - tetrachloro-2-(trichloromethyl)pyridine which comprises (1) charging a heated reactor with a picoline charge, (2) continuously passing gaseous chlorine therethrough to produce gaseous hydrogen chloride, (3) conducting gaseous hydrogen chloride from the heated reactor to a cooled reactor, (4) continuously feeding α-picoline into a cooled reactor to contact and react with hydrogen chloride at temperatures in the range of from about 20° C. to about 70° C. to form a liquid picoline hydrochloride composition, (5) conducting the liquid α-picoline hydrochloride composition to the heated reactor maintained in the temperature range of from about 95° C. to about 120° C. to react with chlorine in the liquid phase in the absence of added water to produce the desired product composition enriched in 3,4,5,6-tetrachloro-2-(trichloromethyl)pyridine, (6) continuously withdrawing the latter from the reaction mixture;

wherein in the foregoing process, the rate of introduction of chlorine into the reactor is such as to provide for its presence therein throughout the reaction in about 80 to 85 percent molar excess on a stoichiometric basis.

16. A continuous process for the preparation of a mixture enriched in 3,4,5,6-tetrachloro-2-(trichloromethyl)pyridine which comprises (1) charging a heated reactor with a picoline charge comprising chlorinated picolines having a density of from about 1.65 to 1.8, (2) continuously passing gaseous chloride therethrough to produce gaseous hydrogen chloride, (3) conducting gaseous hydrogen chloride from the heated reactor to a cooled reactor, (4) continuously feeding α-picoline into a cooled reactor to contact and react with hydrogen chloride at temperatures in the range of from about 20° C. to about 70° C. to form a liquid α-picoline hydrochloride composition, (5) conducting the liquid α-picoline hydrochloride composition to the heated reactor maintained in the temperature range of from about 95° C. to about 120° C. to react with the gaseous chlorine in the liquid phase in the absence of added water to produce the desired product composition enriched in 3,4,5,6-tetrachloro - 2 - (trichloromethyl pyridine.

(6) continuously withdrawing the latter from the reaction mixture;

wherein in the foregoing process, the rate of introduction of chlorine into the reactor is such as to provide for its presence therein throughout the reaction in about 80 to 85 percent molar excess on a stoichiometric basis.

References Cited by the Examiner

UNITED STATES PATENTS 2,679,453  5/1954  Brett et al. _____ 260—290 X

OTHER REFERENCES

Klingsberg: "Pyridine and Derivatives," pt. 2, pp. 303–5 (1961).

McBee et al.: Ind. and Eng. Chem., vol. 39, pp. 389–91 (1947).

Sell: J. Chem. Soc., vol. 93, pp. 1993–5 (1908).

Wibaut et al.: Rec. trav. chim., vol. 58, pp. 709–721 (1939).

JOHN H. MACK, *Primary Examiner.*

DUVAL T. McCUTCHEN, JOHN D. RANDOLPH, *Examiners.*

M. W. WESTERN, H. S. WILLIAMS, *Assistant Examiners.*